INVENTOR.
HAROLD J. McCREARY
BY
E. Hayward Marshall
AGENT

HAROLD J. McCREARY
INVENTOR.

BY
E. Hayward Marshall
AGENT

United States Patent Office 3,270,328
Patented August 30, 1966

3,270,328

METHOD AND APPARATUS FOR THERMALLY SETTING AND CONTROLLING THE GAPS OF NON-CONTACT READOUT ELEMENTS

Harold J. McCreary, Canoga Park, Calif., assignor, by mesne assignments, to The Bunker-Ramo Corporation, Stamford, Conn., a corporation of Delaware Filed Aug. 14, 1962, Ser. No. 217,188
23 Claims. (Cl. 340—174.1)

Figure 1:
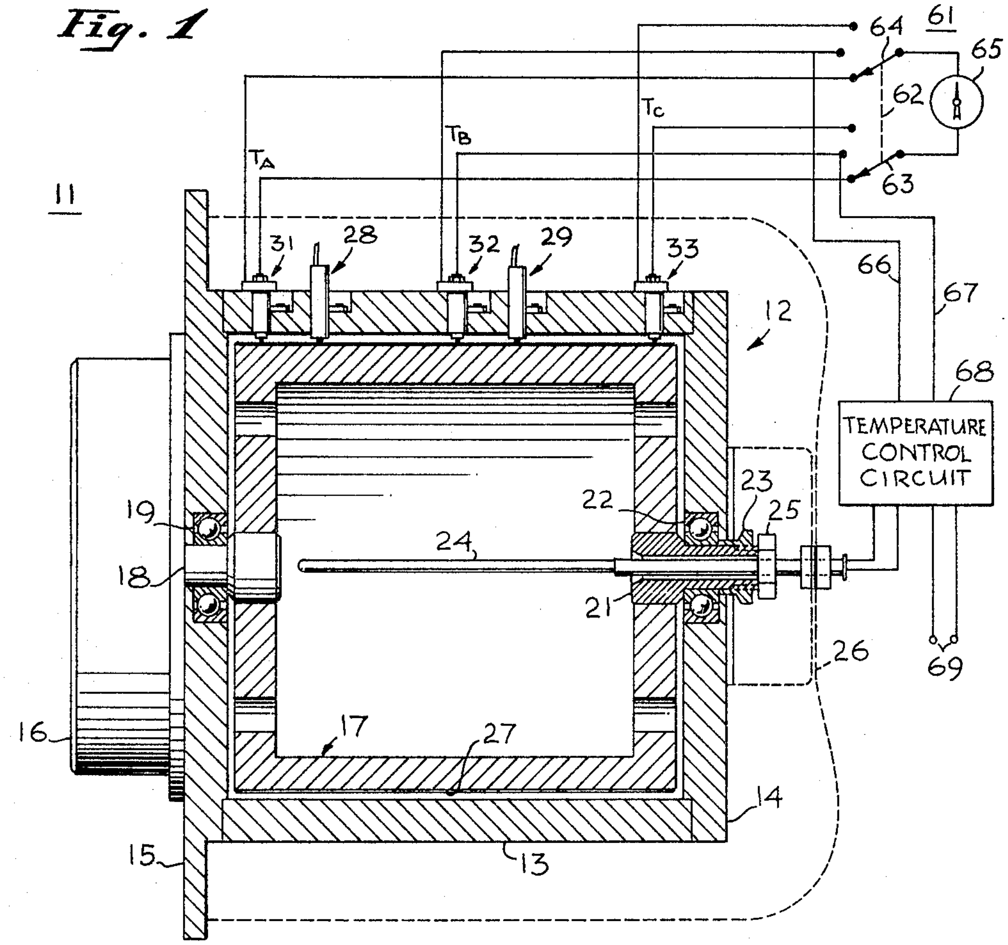

This invention relates to a method and apparatus for setting and controlling the gaps of non-contact readout elements with respect to the surface of an information member, and more particularly to a method and apparatus for accurately positioning the electromagnetic read-write transducer heads in the cylindrical shroud of a magnetic memory drum assembly with respect to the ferromagnetic recording medium on an associated rotary drum to provide gaps between the heads and the drum, and also for continuously monitoring and controlling the temperature differential between the rotating drum and the stationary shroud to maintain the uniform gaps under changing ambient operating temperatures and prevent damage to the heads or the recording medium on the magnetic drum, as may be occasioned by the heads contacting the drum during its rotation.

While the method and apparatus of the present invention are particularly useful with magnetic memory drums, they are also useful in conjunction with any non-contact readout apparatus, where readout elements must be closely positioned but spaced from the surface of an information member, which is movable relative thereto, in order to prevent damage to either the readout elements or the information member.

Many different methods and different types of apparatus have been utilized with varying degrees of success for positioning non-contact readout elements with respect to the surface of an information member. These readout elements may be electromagnetic read-write transducer heads positioned adjacent a drum or a disc having a ferromagnetic coating or recording medium on the surface with information recorded thereon, or the drum or disc may be permanently coded with raised and recessed segments providing the information. The readout elements may depend upon capacitive effects, the Hall-effect or other physical phenomenon in reading out information which is permanently or transiently recorded on the surface of the movable information member.

The most severe problems have occurred in conjunction with magnetic memory drums, wherein a large number of closely spaced heads are mounted in a cylindrical shroud which surrounds a drum having a ferromagnetic coating on the outer surface thereof and operating at extremely high speeds. In order to increase the packing density of the bits of information, it is necessary to record with a minimum field intensity, and therefore the readout heads must be positioned as closely as possible to the recording surface in order to detect the magnetic field variations as recorded.

With the transducer heads positioned very close to the recording surface of the magnetic recording drum, however, temperature variations in the drum and shroud may increase or decrease the critical spacing, which may be in the order of .001″ or less, and either cause the output signal to decrease to an unusable level, or may cause the heads to contact the recording surface of the drum and do serious and extensive damage thereto which will cause shut-down and expensive repairs. It will, therefore, be obvious that the transducer heads must be set accurately with respect to the surface of the information member, such as the magnetic memory drum, and that this optimum spacing must be maintained continuously during operation of the equipment under all environmental conditions and particularly under extreme variations of ambient temperature which may cause rapid expansion or contraction of the drum or shroud. For example, when the cover is removed from around the shroud, after it has been operating at high temperatures, the thermal shock will cause rapid contraction of the shroud relative to the drum and may force the heads into the recording surface to cause severe damage to the drum and heads. Thermal shock may also cause locking-up after a short shut-down, or seizure during operation which would halt the magnetic memory drum and interrupt the operation of an associated computer, possibly during a critical program, for example, during navigational control of an aircraft or missile in flight or during the airport control of the flights of many aircraft in the immediate area.

Many different techniques have been employed for setting transducing heads relative to the surface of a recording or information member, such as a magnetic memory drum. For example, feeler gauges may be inserted between each of the heads and the drum, which is an extremely slow and time-consuming operation, and may also cause damage to the brittle magnetic cores or the frangible, delicate coating on the rotary drum. In another method, dial contact gauges are used for the same purpose by pushing the heads in against the drum and then backing off a distance equal to the desired gap. This requires mounting of the dial gauge on the shroud, and such devices are also inaccurate and unreliable.

One type of memory drum has been provided with a slight taper on both the drum and shroud to provide a conical drum and shroud which are moved axially with respect to each other, until they are in contact, at which time the heads are all set flush with the surface of the drum. When the drum is moved axially in the opposite direction with respect to the shroud a particular distance, a uniform positioning of the heads with respect to the drum is thereby obtained. However, movement of the drum in an axial direction with heads in contact with the recording surface may cause damage by rubbing and abrasion between the magnetic heads and the delicate, frangible layer which comprises the magnetic recording surface on the drum. Furthermore, the necessary structure required for axial movement of the drum with respect to the shroud makes this type of construction more complex and expensive to build and the slight taper to provide a conical surface makes this type of drum and shroud much more difficult and expensive to machine with the high degree of accuracy required.

Some magnetic memory drums have been provided with means for monitoring during operation by using electrostatic pickups, air gauges or the signal output level from certain of the magnetic readout heads to determine the spacing between the rotating drum and the stationary shroud. However, these monitoring systems do not provide any means for controlling the spacing and maintaining an optimum gap between the drum and the read-write transducer heads.

In some cases all of the heads are set flush with the internal surface of the shroud and pneumatic gauges around the shroud at different points are utilized to indicate the spacing between the outer surface of the drum and the internal surface of the shroud.

Briefly stated, the differential head setting and gap controlling method and apparatus of the present invention, as illustrated herein, consist essentially of a magnetic memory drum in which temperature sensitive elements are incorporated, to indicate electrically the temperature of both the drum and shroud, in combination with means for heating and/or cooling both the drum and shroud and control means responsive to the respective temperatures, or temperature differential, for controlling the heating and/or cooling means to maintain a predetermined temperature differential during the setting of the magnetic transducer heads. The present method and apparatus may also be used during normal operation of the equipment for maintaining an optimum gap between the transducer heads and the magnetic recording surface of the drum.

In one particular modification of the present invention, three temperature sensitive devices are provided, each consisting of a pair of thermocouples mounted in a cylindrical body, which may be inserted in one of the openings normally provided in the shroud for a magnetic read-write head. One of these thermocouples is positioned in contact with the drum to sense the temperature thereof and the other thermocouple is positioned in contact with the shroud to sense its temperature. These devices are positioned axially along the surface of the drum to insure the even heating of the drum by a heating element, such as an elongated Calrod unit which may be temporarily inserted through a hollow shaft which supports the drum. The two thermocouples in each temperature sensitive device are preferably connected in series, and a temperature gauge may be selectively connected to each pair of thermocouples to indicate the temperature differential between the drum and shroud. The heater may be controlled manually to provide the desired temperature differential at different points along the drum. The temperature differential at the different positions may be made uniform by varying the position of the heating element within the drum. However, if desired, the required temperature differential may be automatically maintained by means of a control circuit connected to one of the temperature sensitive devices and to the heating element.

This particular arrangement is useful primarily in setting of the heads, when the proper temperature differential is indicated, by setting the inner ends of all the heads in contact with the outer surface of the magnetic drum, while the temperature differential is maintained constant. Subsequently the heating element is turned off and the drum and shroud are permitted to return to normal ambient temperature to provide a uniform gap between all of the heads and the magnetic recording surface of the drum.

On another specific embodiment of the present invention one or more temperature sensitive devices, such as a thermocouple, are incorporated in the shroud, and one or more similar temperature sensitive devices are incorporated or positioned inside of the drum with wires extending out through the hollow shaft to a conventional slip ring arrangement. The thermocouple in the shroud is preferably connected in series with the thermocouple inside of the drum, and the leads connected to a differential amplifier, which may be utilized to control the flow of current through a heating element wrapped spirally around the outer periphery of the shroud. This arrangement will maintain a constant temperature differential during operation of the magnetic memory drum and prevent contraction of the shroud and seizing of the heads on the surface of the drum when the external temperature changes rapidly. This condition is caused when the shroud becomes suddenly colder, for example when the cover is removed, and the resulting thermal shock may cause serious damage and interrupted operation of the magnetic memory drum, as well as its associated computer. If desired, tubing may be wrapped around the shroud in place of the heating element, and the temperature of fluid through the tubing may be controlled automatically, by heating or cooling to maintain any desired temperature differential.

This latter arrangement may also be utilized in conjunction with a heating element temporarily inserted through the hollow shaft for initial setting of the heads in a manner similar to that described above.

However, this latter arrangement not only controls the temperature differential between the drum and the shroud to prevent damage thereto, but also serves to maintain the optimum spacing very accurately between the inner tip end of the read-write heads and the magnetic recording surface on the drum, within the mechanical tolerances established by the machining, bearings, and mounting of the high speed drum with respect to the fixed structure of the shroud.

One object of the present invention is to provide a method and apparatus for rapidly and accurately setting a plurality of readout elements relative to the surface of an information member.

Another object of the present invention is to provide a method and apparatus for continuously monitoring and maintaining a constant temperature differential between a head mounting structure and an information member which are moving at high speed relative to each other for maintaining a constant gap between the transducer head and the information member during normal operation thereof.

A further specific object of the present invention is to provide a method and apparatus for initially setting a plurality of magnetic read-write transducing heads in a cylindrical shroud with respect to the surface of a high speed rotating memory drum and maintaining an optimum spacing or gap therebetween under varying ambient temperature operating conditions.

Figure 2:
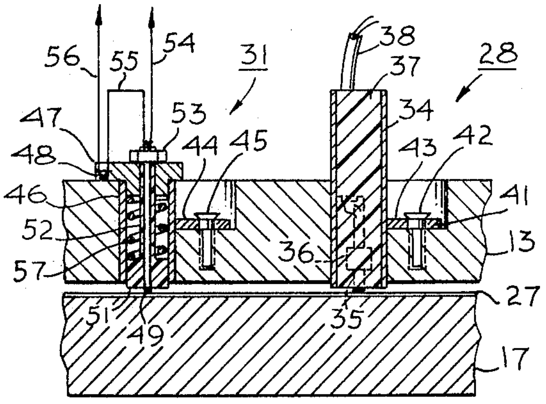
Figure 3:
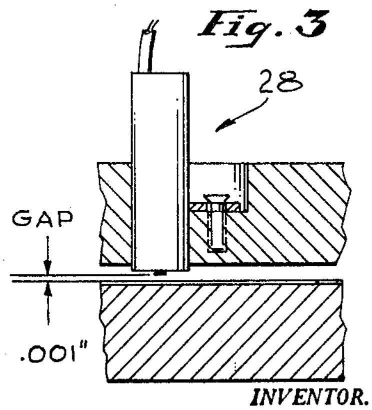
Figure 4:
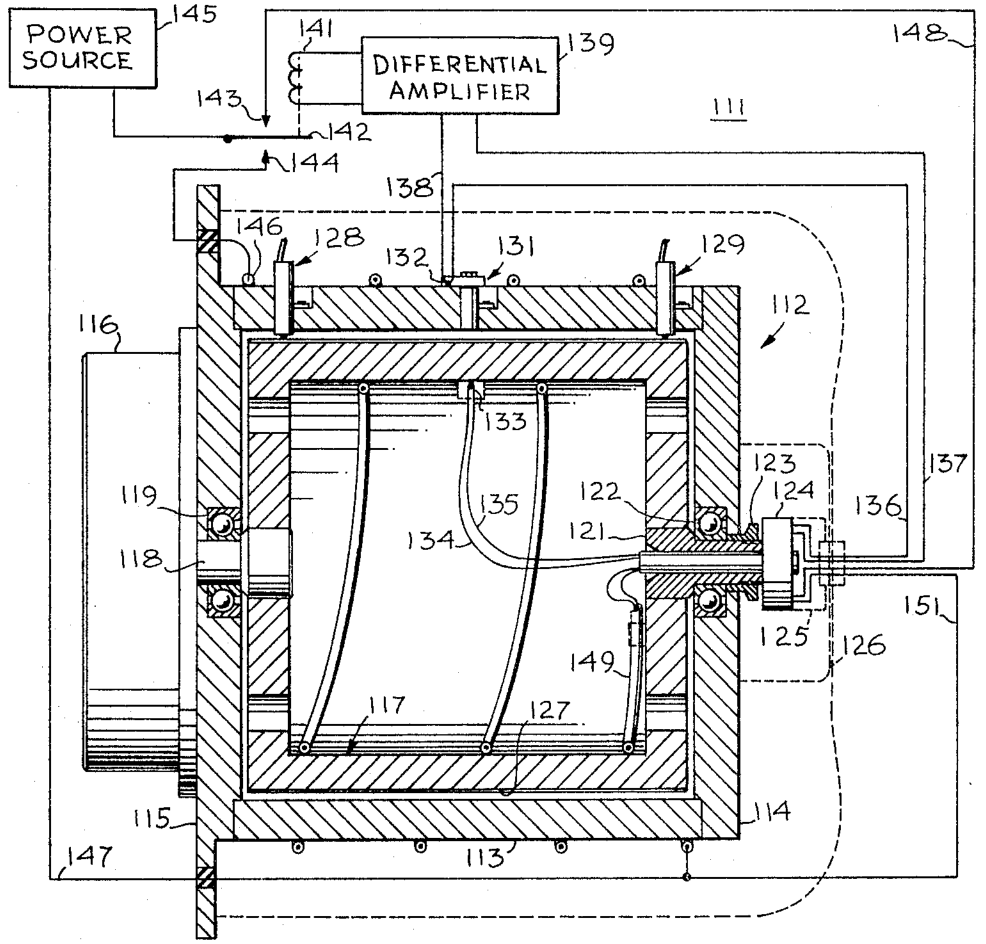

Other objects and many of the attendant advantages of this invention will be readily appreciated, as the same becomes better understood by reference to the following detailed description, when considered in connection with the accompanying drawings wherein:

FIGURE 1 is a longitudinal sectional view of a typical magnetic memory drum assembly with one preferred embodiment of the apparatus of the present invention incorporated therein, and the associated switching, indicating, and control circuitry indicated in a schematic block diagram;

FIGURE 2 is an enlarged fragmentary sectional view showing one of the conventional magnetic read-write transducing heads locked in position in contact with the magnetic recording surface of the drum, after the desired temperature differential between the drum and shroud has been obtained, and the temperature sensing device having one thermocouple in contact with the outer surface of the shroud in series with a second thermocouple resiliently held in contact with the outer surface of the rotary drum;

FIGURE 3 is an enlarged fragmentary sectional view similar to FIGURE 2, but showing the relationship between the drum and shroud after the temperature has equalized, as it would be during normal operation with a present gap between the end of the core in the read-write transducer head and the magnetic coating on the outer surface of the drum; and FIGURE 4 is a longitudinal sectional view similar to FIGURE 1 but illustrating another preferred embodiment of the present invention, wherein any desired temperature differential may be maintained between the drum and shroud during normal operation thereof, by means of a differential amplifier connected to a thermocouple inside the drum in series with another thermocouple on the outside of the shroud. The differential amplifier controls the flow of current to a heating coil on the outside of the shroud, and another heating coil on the inside of the drum, if desired, to control the relative temperatures of the drum and shroud and provide optimum gap spacing, while minimizing the possibility of thermal shock and damage to the drum and heads.

Referring now to the drawings in detail, and more particularly to FIGURES 1, 2 and 3, one preferred embodiment of the apparatus of the present invention is illustrated in FIGURE 1, as applied to a conventional magnetic memory drum structure without any substantial modification thereto.

The magnetic memory drum 11 consists basically of a rigid, fixed, mounting structure 12, including a cylindrical shroud 13 rigidly connected to end plates 14 and 15. A motor 16 is mounted on the end plate 15 and drives the rotary memory drum 17 at relatively high speed through the drive shaft 18. Drive shaft 18 is mounted in a bearing 19 in the end plate 15 for supporting one end of the rotary drum 17, and the opposite end of the drum 17 is provided with a hollow shaft 21 which is mounted in the bearing 22 in the end plate 14.

The drum 17 is held axially in its proper position by a bearing nut and lock washer 23, which is screwed onto the threaded end of the hollow shaft 21. The threaded end of the hollow shaft 21, which protrudes through the nut 23, is also utilized in the present invention for mounting the Calrod unit 24 by means of a collar 25, which is also threaded on the extreme outer end of the threaded hollow shaft 21. The Calrod unit 24, or any other suitable heating element, is slidably mounted in the collar 25. The cover 26, which is shown in dotted lines, normally surrounds the shroud 13 in the manner shown, but is removed during the head setting operation.

The shroud 13, together with end plates 14 and 15, as well as the rotary drum 17, may be made of any suitable material, but are preferably formed of some light-weight material, such as aluminum, which also has a substantial thermal coefficient of expansion and a high heat transfer characteristic. This latter characteristic helps to distribute the heat uniformly, and also dissipates heat as rapidly as possible. The rotary drum 17 is provided with a suitable coating of ferromagnetic material which may be a layer of iron oxide, Permalloy, or any other similar iron and nickel alloy, which is commonly used as a recording medium for magnetic recording.

The shroud 13 is provided with a plurality of spaced cylindrical openings around its periphery in which a large number of electromagnetic read-write transducer heads are mounted radially with their inner ends positioned in close proximity to the ferromagnetic coating 27 on the drum 17.

Two of the many magnetic read-write transducer heads are illustrated in FIGURE 1 at 28 and 29, and one of these heads 28 is also shown in more detail in the enlarged fragmentary sectional views of FIGURES 2 and 3.

The three temperature-sensitive devices 31, 32 and 33 shown in FIGURE 1 are adapted to be mounted in three of the cylindrical openings in the shroud 13 which are normally used for magnetic read-write heads. These three temperature-sensitive devices are spaced axially of the drum 17 to indicate the temperatures at both ends and the center of the drum 17 and shroud 13. One of these devices is also shown in more detail in the enlarged sectional view of FIGURE 2 at 31.

The magnetic read-write transducer head 28, as illustrated in FIGURE 2, is of conventional construction, having a cylindrical case 34 in which a magnetic core 35 in winding 36 are rigidly mounted by a suitable potting compound 37 through which the leads 38 extend. Read-write head 28 is illustrated in FIGURE 2 in contact with the ferromagnetic coating 27, while it is being set in accordance with the present invention and in FIGURE 3 the head 28 is illustrated with the normal operating gap, which would normally be about .001″, as illustrated.

In this particular arrangement the head 28 is locked in position by a wedge block 41 held in position by the cam screw 42 having a cam surface 43 which may be rotated to move the wedge block 41 into locking position against the side of the cylindrical sleeve 34.

The temperature-sensitive devices 31, 32 and 33 are also locked in position by a similar wedge block 44 and the corresponding cam screw 45, as illustrated in detail in FIGURE 2.

The temperature-sensitive device 31, as illustrated in FIGURE 2, consists of a cylindrical case 46 similar to the case 34 but somewhat shorter. A flanged collar 47 has a cylindrical portion or boss, which is tightly fitted in the end of the sleeve or cylindrical case 46, and a flange which mounts the thermocouple 48 and rests firmly against the outer surface of the shroud 13.

A second thermocouple 49 is mounted on the outer end surface of a cylindrical block 51, which is preferably formed of a non-conducting plastic material, such as nylon, and is slidably mounted on a hollow stem 52 in the cylindrical case 46. The hollow stem 52 extends from the block 51 through a bore 53 in collar 47 and the leads 54 and 55 from the thermocouple 49 extend outwardly through the stem 52. One of the leads 55 is connected to the thermocouple 48, which also has another lead 56 extending therefrom. It will be apparent that the two thermocouples 48 and 49 are connected in series in this particular arrangement, although each of the thermocouples could have its own separate leads to the external switching and control circuit.

The nylon block 51 is resiliently urged inwardly in a radial direction by the coil spring 57 which maintains the thermocouple 49 in contact with the ferromagnetic coating 27 on drum 17 during the head setting process. It will be apparent, however, that such an arrangement would not be practical for use in monitoring the drum temperature during actual operation of the drum, since the thermocouple 49 would tend to scrape and damage the fragile ferromagnetic coating or layer 27.

As shown in FIGURE 1, the three temperature sensitive devices 31, 32 and 33 are connected to a switching circuit 61 consisting of a switch 62 having two contacts 63 and 64 connected across a temperature indicating meter 65, which is preferably a galvanometer or potentiometer calibrated to indicate the temperature differential. It will be apparent that the switch 62 may be readily operated to sequentially indicate the temperature differential at each of the temperature sensitive devices 31, 32 and 33.

If desired, the leads 66 and 67 from the centrally located temperature sensitive device 32 may be connected to a temperature control circuit 68 which will automatically control the flow of current from a power source connected to the terminals 69 through the heating element 24.

The temperature control circuit 68 may be any one of many conventional circuits adapted to perform this function, or may be a differential amplifier, such as the one which will be described in conjunction with the modification of FIGURE 4. However, if desired, the temperature control circuit 68 may be manually controlled through a rheostat or a high-low switch (not shown) in accordance with the temperature differential indicated on the temperature gauge 65. In the latter case, the connections 66 and 67 would not be necessary.

The modification of the present invention illustrated in FIGURE 4 constitutes another preferred embodiment of the present invention, wherein temperature differential may be automatically and accurately controlled for initially setting the read-write heads, and may also be utilized for monitoring the temperature differential between the drum and shroud for maintaining a uniform gap between the ends of the cores in the read-write heads and the outer surface of the ferromagnetic recording layer or coating on the rotary drum.

In this particular embodiment, the same conventional magnetic memory drum assembly 111 has been illustrated, similar to that illustrated in FIGURE 1.

The mounting structure 112 includes cylindrical shroud 113 connected to end plates 114 and 115. A motor 116 drives the rotary memory drum 117 through a drive shaft 118 extending through a bearing 119 in the end plate 115. A hollow shaft 121 extending from the opposite end of the rotary memory drum 117 is mounted in a bearing 122 in end plate 114 and is also provided with a bearing nut and lock washer 123.

In this modification, however, a slip ring assembly is provided on the end of the hollow shaft 121, consisting of a rotor 124 having four conductive rings and a brush block 125 having four brushes contacting the corresponding conductive rings. Block 125 is mounted on the stationary cover plate 126.

The shroud 113 is also provided with a plurality of spaced cylindrical openings around its periphery in which a large number of electromagnetic read-write transducer heads are mounted radially with their inner ends positioned in close proximity to the ferromagnetic coating 127 on the drum 117. Two of these many read-write heads are illustrated at 128 and 129, and these heads are similar to the one shown at 28 in FIG. 2.

A flanged cylindrical plug 131 is mounted in one of the radial openings in the shroud 113, and is provided with a thermocouple 132 positioned to contact the outer surface of the shroud 113 in a manner similar to thermocouple 48 in FIG. 2.

Another thermocouple 133 is mounted on the inside of the rotary drum 117 and is provided with leads 134 and 135 extending out to two of the slip rings on the rotor 124. These rings are connected through two of the brushes in the brush block 125 to the external leads 136 and 137. Lead 136 is connected in series through the thermocouple 132 and another lead 138 to a differential amplifier 139. Differential amplifier 139 is also connected to lead 137 and is responsive to the temperature differential between the shroud 113 and drum 117, as indicated by the thermocouples 132 and 133, to operate a relay 141.

Relay 141 is provided with an armature or blade 142 movable between contacts 143 and 144. Armature 142 is connected to one side of a power source 145 and contact 144 is connected through a heating coil 146 spirally wound around the outside of the shroud 113 and through another lead 147 to the power source 145. Contact 143 is connected through a lead 148 to another brush in the brush block 125 and through another one of the slip rings to the heating coil 149 spirally wound inside of the drum 117. Heating coil 149 is connected at its other end through the fourth slip ring and brush to an external lead 151, also connected through lead 147 to the power source 145.

It will be apparent that the differential amplifier 139 will respond to an increase in the temperature differential between the drum 117 and the shroud 113 to actuate the relay 141 in one direction, so that the armature 142 engages contact 144 for energizing the heating element 146 around the shroud 113. Since the drum 117 would normally be operating at a higher temperature than the shroud 113, heating the shroud 113 will obviously tend to decrease the temperature differential to that required for normal operation of the magnetic memory drum 111.

If the temperature differential decreased during operation, so that the spacing or gap between the read-write heads, such as 128 and 129, and the ferromagnetic coating 127 on the drum 117 increases to reduce the signal level, then the relay 141 would be actuated in the opposite direction to engage armature 142 with contact 143 to energize the heating coil 149. This would then tend to heat and expand the drum 117 and reduce the gap to the optimum for normal operation.

It will be apparent that the arrangement illustrated in FIG. 4 may also be utilized for setting the heads 128 and 129 against the ferromagnetic coating 127 on the drum 117, by adjusting the differential amplifier 139 to maintain the temperature differential for setting the heads, and then readjusting the differential amplifier 139 to monitor and maintain another temperature differential which is optimum for normal operation of the magnetic memory drum 111 with the rotary drum 117 operating at relatively high speeds.

It will be apparent that the spirally wound heating elements 146 and 149 could readily be replaced by a fluid conduit or tubing spirally wound around the outside of the shroud 113, as shown for the heating element 146, and a fluid continuously circulated through the tubing. With this latter arrangement (not shown), the differential amplifier 139 could be utilized to control the temperature of the fluid for heating and/or cooling of the shroud 113 for maintaining the optimum temperature differential, as required for setting of the read-write heads or for maintaining the optimum gap during normal operation of the magnetic memory drum 111.

*Method*

Briefly stated, the method for setting and controlling the gaps of non-contact readout elements, such as electromagnetic read-write transducer heads, with respect to the surface of an information member, such as a high-speed magnetic memory drum with a ferromagnetic recording layer thereon, consists essentially of the following steps:

A. Producing and maintaining a predetermined temperature differential between the information member and the mounting structure for the readout elements to reduce the space therebetween;

B. Adjusting and securing each of the readout elements in contact with the surface of the information member; and C. Producing and maintaining a smaller temperature differential between the information member and the mounting structure during normal operation of the apparatus to maintain the desired optimum spacing between the readout elements and the surface of the information member.

More specifically with reference to FIGURES 1, 2 and 3, the method of the present invention for setting the gaps between a large number of electromagnetic read-write transducer elements, such as the one indicated by the numeral "28," and the surface of the ferromagnetic recording layer 27 on the high-speed rotary drum 17, is carried out in the following manner:

First, the heating element, such as Calrod unit 24, is inserted through the hollow shaft 21 and collar 25 is threaded on the end of shaft 21 for slidably mounting the Calrod unit 24 inside of drum 17.

Next, the temperature control circuit 68 is operated to energize the heating element 24.

With a manual control on the temperature control circuit 68, the Calrod heating element 24 is left on until one of the temperature sensitive devices 31, 32 and 33 indicates the proper temperature differential between the drum 17 and the cylindrical shroud 13.

One specific example of a conventional magnetic memory drum assembly, such as that shown in FIGURE 1, will be considered, wherein the rotary drum 17 has an external diameter of 9″ and is approximately 9″ long. The wall of the drum may have a thickness of approximately ¾″ and an iron oxide coating of .001″. A temperature differential of $11\pm1°$ C., after the drum has been heated to a higher temperature than the shroud, will produce a thermal expansion of the drum 17 with respect to the shroud 13, of $0.0010\pm.002''$.

After one of the temperature sensing devices 31, 32 and 33 has indicated the proper temperature differential on the temperature indicating meter 65, the temperature control circuit 68 is adjusted to provide a lower current through the heating element 24, which would be just sufficient to maintain the desired temperature differential. Each of the temperature sensing devices 31, 32 and 33 is then sequentially checked by use of the switch 62 to indicate the temperature differential at different points axially along the drum 17, until a uniform temperature differential is obtained, as indicated by the same reading on the meter 65 for each of the temperature sensitive devices 31, 32 and 33.

All of the heads are then inserted through the cylindrical openings in the shroud 13 and are moved inwardly until the inner ends of the cores 45 are contacting the ferromagnetic recording layer 27 on the outer surface of the drum 17. All of the heads are then locked in position by rotating the cam screws 42 to move the wedge box 41 into locking position against the sides of the cylindrical sleeves 34, as indicated in FIGURE 2.

The temperature control circuit 68 is then operated to turn off the heating element 24 and both the drum 17 and shroud 13 are permitted to return to ambient temperature, which will provide a uniform gap spacing of .001" between the inner ends of the cores 35 and the ferromagnetic recording layer 27 on drum 17, as indicated in FIGURE 3.

The operation of the modification illustrated in FIGURE 4 for setting of the heads initially is identical to that described above in conjunction with FIGURES 1, 2 and 3, except for the fact that the differential amplifier 139 would be adjusted to maintain a temperature differential of 11° C., and it is obviously unnecessary to insert and remove the heating element 149 for the head setting operation.

During normal operation of this modification, it was only necessary to set the differential amplifier 139 for 0° temperature differential in order to maintain the .001" gap spacing. However, if desired, any other temperature differential may be established by properly adjusting the differential amplifier 139 in order to maintain the optimum gap spacing for the particular equipment.

It will be apparent that, during the normal operation of the magnetic memory drum assembly shown in FIGURE 4, either the heating coil 146 around the shroud 113 or the heating coil 149 inside of the drum 117 will be energized as required to maintain a constant temperature differential, regardless of external temperatures, or sudden temperature changes, which may be caused, for example, by removing the cover 126, either during operation or shut-down for repairs and adjustment.

Having thus described the present invention, what is claimed is:

1. In a magnetic recording apparatus having a rotatable recording medium support, at least one magnetic transducing head and means for adjustably supporting said transducing head relative to a surface of said recording medium, the method for locating said transducing head in spaced relationship to said surface of said recording medium comprising:

(A) thermally producing and maintaining a negative dimensional change in a distance between said surface of said recording medium and said supporting means for said transducing head;

(B) adjustably positioning and securing said head in contact with said surface of said recording medium; and (C) terminating maintenance of said thermally reduced dimensional change to permit a positive dimensional change in said distance.

2. In a magnetic recording apparatus having a rotatable drum, at least one magnetic transducing head and means for adjustably supporting said transducing head relative to a recording medium carrying surface of said drum, the method for locating said transducing head in spaced relationship to said surface of said recording medium comprising:

(A) thermally producing and maintaining a negative dimensional change in a distance between said recording medium and said supporting means for said transducing head;

(B) positioning and securing said head in contact with said recording medium; and (C) terminating maintenance of said dimensional change to permit a positive dimensional change in said distance.

3. In a method for setting a magnetic transducer head relative to a recording medium carried by a support, the steps of:

(A) thermally changing a physical size of said support and said recording medium carried thereby for a period of time; and (B) positioning and retaining said head in contact with said recording medium in said period of time whereby upon termination of said thermally changed size of said support, said head is retained in a predetermined spaced relationship to said recording medium.

4. In a method for setting a magnetic transducer head relative to a recording medium, the steps of:

(A) initially positioning said head and a support for said recording medium in a normally fixed spaced relationship;

(B) thermally inducing a predetermined negative change in said spaced relationship for a period of time; and (C) repositioning and retaining said head in contact with said recording medium in said period of time whereby upon termination of said thermally induced negative change in said spaced relationship, said head is spaced a final and desired distance from said recording medium.

5. In a magnetic recording apparatus having a rotatable drum, at least one magnetic transducing head and means for adjustably supporting said transducing head relative to a recording medium carrying surface of said drum, the method for locating said transducing head in spaced relationship to said surface of said recording medium comprising:

(A) thermally producing and maintaining a negative dimensional change in a distance between said recording medium and said supporting means for said transducing head for a period of time;

(B) adjustably positioning and securing said head in contact with said recording medium in said period of time; and (C) terminating maintenance of said dimensional change following said period of time to permit a positive dimensional change in said distance.

6. In a magnetic recording apparatus having a rotatable drum, at least one magnetic transducing head and means for adjustably supporting said transducing head relative to a recording medium carrying surface of said drum, the method for locating said transducing head in spaced relationship to a surface of said recording medium comprising the steps of:

(A) heating said drum to thermally produce and maintain for a time period a negative dimensional change in a distance between said surface of said recording medium and said supporting means for said transducing head;

(B) adjustably positioning and securing said head in contact with said surface of said recording medium in said time period; and (C) terminating maintenance of said dimensional change to permit a positive dimensional change in said distance.

7. In a magnetic recording apparatus having a rotatable drum, at least one magnetic transducing head and means for adjustably supporting said transducing head relative to a recording medium carrying surface of said drum, the method for locating said transducing head in spaced relationship to a surface of said recording medium comprising the steps of:

(A) thermally producing and maintaining a negative dimensional change in a distance between said surface of said recording medium and said supporting means for said transducing head;

(B) monitoring a temperature differential between said drum and said supporting means for determination of a finite value of said dimensional change;

(C) adjustably positioning and securing said head in contact with said surface of said recording medium; and (D) terminating maintenance of said dimensional change to permit a positive dimensional change in said distance substantially equivalent to said finite value.

8. In a magnetic recording apparatus having a rotatable drum, at least one magnetic transducing head and means for adjustably supporting said transducing head relative to a recording medium carrying surface of said drum, the method for locating said transducing head in spaced relationship to a surface of said recording medium comprising the steps of:

(A) thermally producing and maintaining a negative dimensional change in a distance between said surface of said recording medium and said supporting means for said transducing head;

(B) individually monitoring respective temperatures of said drum and said supporting means for determination of a temperature differential therebetween and a finite value of said dimensional change;

(C) controlling and maintaining said temperatures for a period of time;

(D) adjustably positioning and securing said head in contact with said surface of said recording medium in said period of time; and (E) terminating maintenance of said dimensional change to permit a positive dimensional change in said distance and substantially equivalent to said finite value.

9. Apparatus for accurately positioning a plurality of readout elements relative to the surface of an information member comprising:

(A) an information member;

(B) a mounting structure associated with said information member for relative movement therebetween;

(C) a plurality of readout elements adjustably mounted in said mounting structure in contiguous spaced relation to said information member;

(D) means for securing said heads in said mounting structure;

(E) means for establishing a temperature differential between said information member and said mounting structure; and (F) temperature sensing means contacting said information member and said mounting structure for sensing the respective temperatures thereof.

10. Apparatus for accurately positioning a plurality of readout elements relative to the surface of an information member comprising:

(A) an information member;

(B) a mounting structure associated with said information member for relative movement therebetween;

(C) A plurality of readout elements adjustably mounted in said mounting structure in contiguous spaced relation to said information member;

(D) means for securing said heads in said mounting structure while in contact with the surface of said information member;

(E) means for establishing a temperature differential between said information member and said mounting structure to decrease the spacing therebetween; and (F) temperature sensing means contacting said information member and said mounting structure for sensing and indicating the respective temperatures thereof.

11. Apparatus as set forth in claim 10 wherein said information member and said mounting structure are formed of material having a substantial thermal coefficient of expansion and a relatively high heat transfer characteristic.

12. Apparatus as set forth in claim 10 wherein control means is provided responsive to said temperature sensing means for maintaining said temperature differential for adjusting and securing said readout elements.

13. Apparatus as set forth in claim 12 wherein said control means may be adjusted for maintaining another temperature differential during normal operation of said apparatus for maintaining a substantially constant and uniform spacing between said readout elements and the surface of said information member.

14. Apparatus for accurately positioning a plurality of electromagnetic read-write transducer heads relative to a ferromagnetic recording layer on the rotary drum of a magnetic memory drum assembly comprising:

(A) a rotary drum having a ferromagnetic recording layer thereon;

(B) a mounting structure rotatably supporting said rotary drum and including a shroud surrounding said drum with a plurality of cylindrical openings therethrough;

(C) a plurality of electromagnetic read-write transducer heads positioned in said cylindrical openings, said transducer heads having a core positioned in contiguous spaced relation to said recording layer;

(D) means for securing said heads in said openings;

(E) means for establishing a predetermined temperature differential between said rotary drum and said shroud to decrease the spacing therebetween; and (F) temperature sensing means contacting said rotary drum and said shroud for sensing their respective temperatures.

15. Apparatus as set forth in claim 13 wherein means is selectively connected to said temperature sensing means for indicating the temperature differential between said drum and shroud, whereby said transducer heads may be positioned with their cores in contact with said drum at a predetermined temperature differential and secured to provide a substantially uniform gap during normal operation of said apparatus at ambient temperature.

16. Apparatus as set forth in claim 13 wherein control means is provided responsive to said temperature sensing means for maintaining said predetermined temperature differential for adjusting and securing said transducer heads in contact with said memory drum.

17. Apparatus as set forth in claim 15 wherein said control means is adjustable for maintaining a second predetermined temperature differential during normal operation of said apparatus for maintaining a substantially constant and uniform spacing between said transducer heads and said drum.

18. In a magnetic memory drum assembly including a rotary drum and a stationary shroud with a plurality of transducer heads positioned in contiguous spaced relation to said drum, the improvement comprising:

(A) means for maintaining a predetermined temperature differential between said shroud and drum during operation of said assembly with said drum rotating at high speed.

19. In a magnetic memory drum assembly including a rotary drum and a shroud for adjustably mounting a plurality of transducer heads in contiguous spaced relation to said drum, said shroud and drum being constructed of materials having specified pressure coefficients, the improvement comprising:

(A) heating means thermally coupled to said drum but substantially insulated from said shroud;

(B) means for monitoring the temperature of said drum;

(C) means for monitoring the temperature of said shroud; and (D) control means responsive to the temperatures of said drum and shroud to control said heating means for maintaining a predetermined temperature differential between said shroud and drum.

20. The method of adjusting and operating apparatus having a movable member with an information layer on one surface thereof and a structure adjustably mounting a plurality of readout heads in spaced relation to said layer, comprising the following steps:

(A) producing and maintaining a predetermined temperature differential between said member and said head mounting structure to reduce the space therebetween;

(B) adjusting and securing each of said heads in contact with said layer; and (C) reducing said temperature differential for maintaining the desired spacing between said heads and said layer during normal operation.

21. The method of adjusting and operating magnetic memory apparatus having a rotary drum with a ferromagnetic recording layer on the outer surface thereof and a shroud adjustably mounting a plurality of electromagnetic transducing heads in spaced relation to said layer, comprising the following steps;

(A) producing and maintaining a predetermined temperature differential between said rotary drum and said shroud to reduce the space therebetween;

(B) adjusting and securing each of said heads in contact with said layer; and (C) reducing said temperature differential for maintaining the desired spacing between said heads and said layer during normal operation.

22. The method of adjusting and operating apparatus having means for supporting an information layer and means for adjustably mounting a plurality of readout heads in contiguous spaced relation to said layer for relative movement therebetween, comprising the following steps;

(A) producing and maintaining a predetermined temperature differential between said supporting means and said mounting means to reduce the space therebetween;

(B) adjusting and securing each of said heads in contact with said layer; and (C) producing and maintaining a smaller temperature differential between said supporting and mounting means during normal operation of said apparatus to maintain the desired optimum spacing between said heads and said layer.

23. The method of adusting and operating a magnetic memory drum assembly having a rotary drum with a ferromagnetic recording layer and a shroud for adustably mounting a plurality of electromagnetic transducing heads in contiguous spaced relation to said layer, comprising the following steps:

(A) producing and maintaining a predetermined temperature differential between said drum and said shroud to reduce the space therebetween;

(B) adjusting and securing each of said heads in contact with said layer; and (C) producing and maintaining a smaller temperature differential between said drum and shroud during normal operation of said assembly to maintain the desired optimum spacing between said heads and said layer.

No references cited.

BERNARD KONICK, *Primary Eaminer.*

A. I. NEUSTADT, *Assistant Examiner.*